United States Patent
Liu et al.

(10) Patent No.: US 11,664,723 B2
(45) Date of Patent: May 30, 2023

(54) SINGLE-PHASE AND THREE-PHASE COMPATIBLE CONVERSION CIRCUIT AND VEHICLE-MOUNTED CHARGER

(71) Applicant: Shenzhen Vmax New Energy Co.,Ltd., Guangdong (CN)

(72) Inventors: Jun Liu, Guangdong (CN); Yingying Feng, Guangdong (CN); Shun Yao, Guangdong (CN); Renwei Feng, Guangdong (CN)

(73) Assignee: SHENZHEN VMAX NEW ENERGY CO., LTD., Guangdong (CN)

( * ) Notice: Subject to any disclaimer, the term of this patent is extended or adjusted under 35 U.S.C. 154(b) by 278 days.

(21) Appl. No.: 17/198,519

(22) Filed: Mar. 11, 2021

(65) Prior Publication Data

US 2021/0288575 A1    Sep. 16, 2021

(30) Foreign Application Priority Data

Mar. 12, 2020   (CN) .......................... 202010172650.X (51) Int. Cl.
| | |
|---|---|
| *H02M 1/42* | (2007.01) |
| *H02J 7/06* | (2006.01) |
| *H02M 1/12* | (2006.01) |
| *H02M 1/14* | (2006.01) |
| *H02M 1/44* | (2007.01) |
| *B60L 53/22* | (2019.01) |

(52) U.S. Cl.
CPC ........... *H02M 1/4233* (2013.01); *B60L 53/22* (2019.02); *H02J 7/06* (2013.01); *H02M 1/126* (2013.01); *H02M 1/14* (2013.01); *H02M 1/44* (2013.01); *H02J 2207/20* (2020.01); *H02M 1/123* (2021.05)

(58) Field of Classification Search
CPC ......... B60L 53/22; H02M 1/126; H02M 1/14; H02M 1/4233; H02M 1/44; H02J 2207/20
See application file for complete search history.

(56) References Cited

U.S. PATENT DOCUMENTS 9,718,374 B2 * 8/2017 Tang ..................... H02J 7/0063
11,201,537 B2 * 12/2021 Yu .......................... H02M 1/32

FOREIGN PATENT DOCUMENTS

WO    WO-2020233741 A1 * 11/2020 .............. B60L 53/11

* cited by examiner

*Primary Examiner* — Richard Isla
*Assistant Examiner* — Sadia Kousar
(74) *Attorney, Agent, or Firm* — Locke Lord LLP; Tim Tingkang Xia, Esq.

(57) ABSTRACT

A single-phase and three-phase compatible conversion circuit includes an EMC module, a PFC module, a switch K1 and a control module. The EMC module is connected between lines A, B, C and N of a power grid and the PFC module. Three lines A1, B1 and C1 are led out from the EMC module and are connected with the PFC module, and are respectively connected to a set virtual midpoint through capacitors CX1, CX2, and CX3. The virtual midpoint is connected to a bus midpoint of the PFC module through the switch K1. The control module is used for detecting a power grid input signal and controlling the state of the switch K1 according to the type of the power grid input signal. The common-mode noise of the three-phase conversion mode can be reduced, and the three-phase conversion mode can be controlled within a larger bus voltage regulation range.

16 Claims, 10 Drawing Sheets

SINGLE-PHASE AND THREE-PHASE COMPATIBLE CONVERSION CIRCUIT AND VEHICLE-MOUNTED CHARGER

CROSS-REFERENCE TO RELATED PATENT APPLICATION

This application claims priority to Chinese Patent Application No. 202010172650.X filed in China on Mar. 12, 2020. The disclosure of the above application is incorporated herein in its entirety by reference.

TECHNICAL FIELD

The present invention belongs to the technical field of charging of electric vehicles, and more particularly relates to a single-phase and three-phase compatible conversion circuit and a vehicle-mounted charger.

BACKGROUND ART

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In view of energy conservation and emission reduction, green travel is advocated, such that the demands for new energy vehicles are increasing, wherein electric vehicles play a key role in new energy vehicles. A vehicle-mounted charger is an important part of electric vehicles, which is conducive for the electric vehicles to achieve no fixed areas and forms of energy. However, single-phase and three-phase compatible vehicle-mounted chargers are widely used, and can be applied to various grid environments. In particular, three-phase vehicle-mounted chargers can reduce the waiting time for charging.

Although the single-phase and three-phase compatible vehicle-mounted chargers can bring various conveniences to electric vehicle charging, there are many challenges in the design of their main circuits. The single-phase and three-phase compatible vehicle-mounted charger will be switched between a single-phase operating mode and a three-phase operating mode according to actual charging environments. Generally, in the three-phase operating mode, in order to reduce the common-mode noise on an alternating-current side and a direct-current side, a midpoint (O) of the direct-current side is connected to a line N through a capacitor, so that the noise is transmitted to the line N instead of the ground, and components of the interference directly transmitted to the outside of a module through the ground are reduced. Meanwhile, a Y capacitor can be connected to a direct-current bus midpoint so as to filter the noise. In the case of switching to the single-phase operating mode, the midpoint (O) of the direct-current side will form an interference source, and this capacitor will increase the common-mode noise on the alternating-current side and the direct-current side. In addition, in some documents, the common mode interference during three-phase operation is reduced by connecting a line N to a bus midpoint. However, this results in the limitation of a voltage regulation range of the PFC bus, such that space vector control and other modes cannot be used to allow the bus voltage to be regulated within a wider range. Meanwhile, the connection of the line N is difficult to be compatible with single-phase input.

SUMMARY

An objective of the present invention is to provide a single-single and three-phase compatible conversion circuit structure and a vehicle-mounted charger, in view of different common-mode noise sources and paths in a three-phase charging mode and a single-phase charging mode of a vehicle-mounted charger in the above-mentioned prior art.

In an embodiment of the present invention, a single-phase and three-phase compatible conversion circuit is provided. The circuit comprises an EMC module, a PFC module, a switch K1 and a control module; the EMC module is connected between lines A, B, C and N of a power grid and the PFC module; three lines A1, B1 and C1 are led out from the EMC module and are connected with the PFC module; the three lines A1, B1 and C1 are respectively connected to a set virtual midpoint through capacitors CX1, CX2 and CX3; the virtual midpoint is connected to a bus midpoint of the PFC module through the switch K1; the control module is used for detecting a power grid input signal and controlling the state of the switch K1 according to the type of the power grid input signal.

In an embodiment of the present invention, the virtual midpoint is grounded through a capacitor CY1.

In an embodiment of the present invention, wherein when the power grid is connected to three-phase power, the control module controls the switch K1 to be turned on; and when the power grid is connected to single-phase power, the control module controls the switch K1 to be turned off.

In an embodiment of the present invention, the EMC module comprises an EMC filter and a switching device; the EMC filter is composed of filter units that filter the lines A, B, C, and N respectively; and the switching device is composed of switches arranged among the lines A, B, C, and N and used for switching the form of the EMC filter.

In an embodiment of the present invention, when the power grid is connected to three-phase power, the switching device sets the EMC filter to a form of filtering the lines A, B, C, and N of the power grid; and when the power grid is connected to single-phase power, the switching device sets the EMC filter to a two-way filtering form.

In an embodiment of the present invention, K1 is a single-pole double-throw switch; when the power grid is connected to three-phase power, the control module controls the switch K1 to turn on the virtual midpoint and the bus midpoint of the PFC module; when the power grid is connected to single-phase power, the line N of the power grid is output through one of the three lines A1, B1, and C1 led out from the EMC module; and the control module controls the switch K1 to turn on the virtual midpoint and the line N output from the EMC module.

In an embodiment of the present invention, a single-phase and three-phase compatible conversion circuit is provided. The single-phase and three-phase compatible conversion circuit comprises an EMC module, a PFC module, a single-pole double-throw switch K2 and a control module, wherein the EMC module is connected between lines A, B, C, and N of a power grid and the PFC module; three lines A1, B1 and C1 are led out from the EMC module and are connected with the PFC module; the three lines A1, B1 and C1 are respectively connected to a set virtual midpoint through capacitors CX1, CX2 and CX3; and the virtual midpoint is connected to a fixed contact of the single-pole double-throw switch K2; a serial fly-wheeling device is also arranged between buses of the PFC module; a midpoint of the serial free-wheeling device is connected to a line N1 led out from the EMC module; a first dynamic contact of the single-pole double-throw switch K2 is connected to the bus midpoint of the PFC module; a second dynamic contact of the single-pole double-throw switch K2 is connected to the line N1 led out from the EMC module; and the control module is used for detecting a grid input signal and controlling the state of the single-pole double-throw switch K2 according to the type of the grid input signal.

In an embodiment of the present invention, the serial free-wheeling device comprises at least two diodes connected in series or at least two transistors connected in series.

In an embodiment of the present invention, when the power grid is connected to three-phase power, the control module controls the first dynamic contact of the single-pole double-throw switch K2 to be turned on; and when the power grid is connected to single-phase power, the control module controls the second dynamic contact of the single-pole double-throw switch K2 to be turned on.

In an embodiment of the present invention, the EMC module comprises an EMC filter and a switching device; the EMC filter is composed of filter units that filter the lines A, B, C, and N respectively; and the switching device is composed of switches arranged among the lines A, B, C, and N and used for switching the form of the EMC filter.

In an embodiment of the present invention, when the power grid is connected to three-phase power, the switching device sets the EMC filter to a form of filtering the lines A, B, C, and N of the power grid; and when the power grid is connected to single-phase power, the switching device controls a filter unit on the line A of the filter to be connected to the PFC module alone, or controls the filter unit on the line A of the filter to be connected in parallel with a filter unit on the line B or a filter unit on the line C and then connected to the PFC module, or controls the filter unit on the line A of the filter to be connected in parallel with the filter unit on the line B and the filter unit on the line C and then connected to the PFC module.

The present invention further provides a vehicle-mounted charger, which adopts the single-phase and three-phase compatible conversion circuit.

Compared with the prior art, the single-phase and three-phase compatible conversion circuit of the present invention is characterized in that, in the three-phase operating mode, the virtual midpoint formed by the capacitors CX1 to CX3 may be in short connection to the bus midpoint through K1 to form a common-mode current loop, thereby reducing the common-mode noise output to the power grid. Meanwhile, the virtual midpoint voltage is not equal to the N-line voltage, such that the PFC stage can use space vector control and other methods to adjust the bus voltage within a larger range. At this time, the virtual midpoint voltage produces a low-frequency fluctuation that is 3 times of the power frequency, as well as extremely small high-frequency noise, relative to the N-line voltage. In the single-phase operating mode, the virtual midpoint is controlled to be disconnected from the bus midpoint, which cuts off the common-mode noise caused by the midpoint of the direct-current side. Meanwhile, by switching the form of the EMC filter circuit to achieve single-phase filtering, the windings of the three-phase filter can be fully utilized for switching, thereby increasing the utilization rate of the windings and reducing the cost of components.

The single-phase and three-phase compatible conversion circuit of the present invention can compatibly reduce the EMC noise in the three-phase conversion mode and the single-phase conversion mode, and adjust adjust the PFC bus voltage within a wider range by adopting an optimized control method (such as space vector control) in the three-phase conversion mode, thereby optimizing the performances of the complete machine. The single-phase operation cuts off the noise while reducing the input ripple through interleaving, and maximizes the use of filter components by switching the EMC filter.

BRIEF DESCRIPTION OF THE DRAWINGS

The following accompanying drawings of the present invention are used here as part of the present invention to understand the present invention. Embodiments of the present invention and their descriptions are shown in the accompanying drawings to explain the principles of the present invention. In the accompanying drawings.

DETAILED DESCRIPTION

Figure 1:
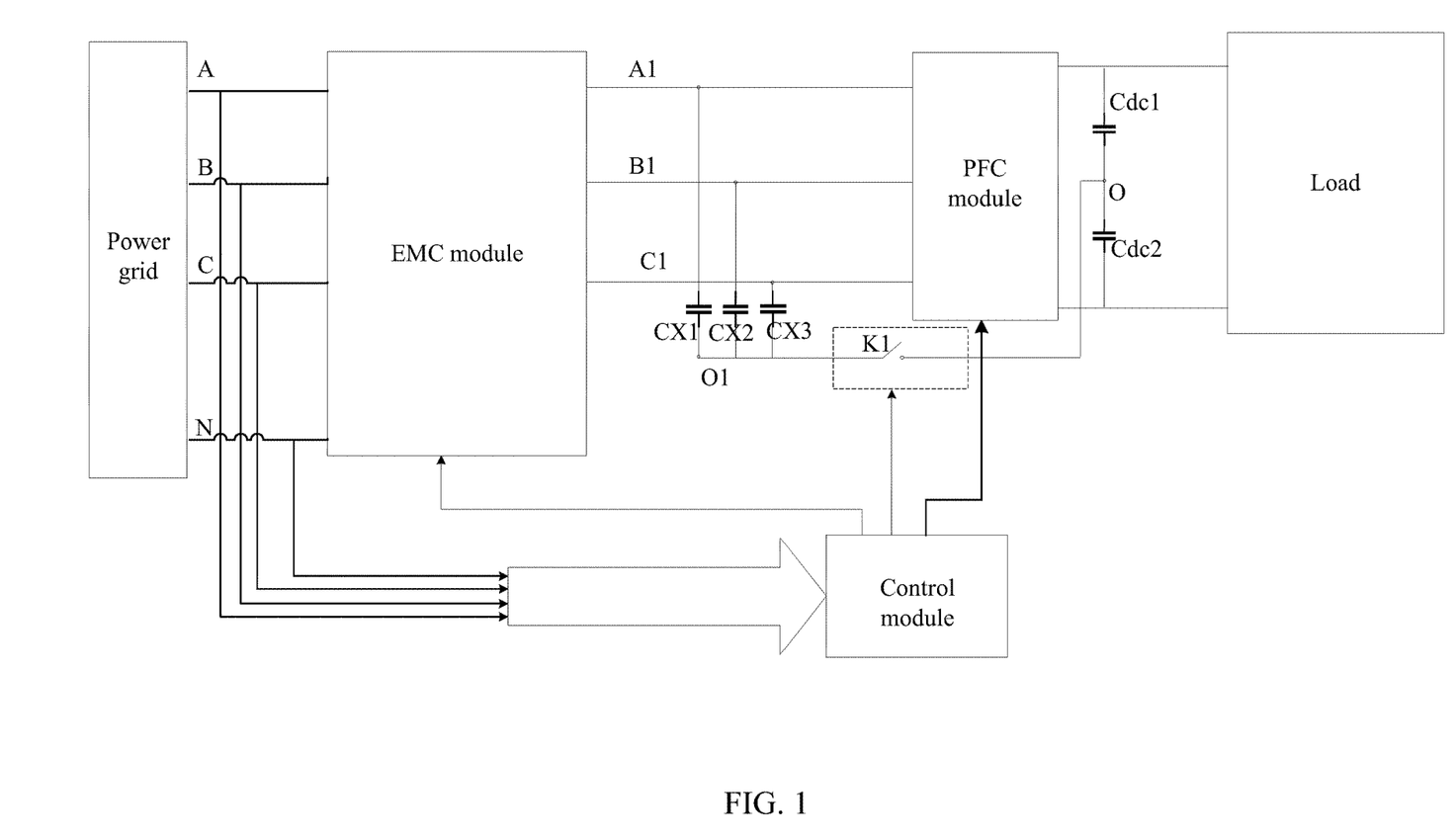
FIG. 1 is a circuit diagram of a first single-phase and three-phase compatible conversion circuit according to an embodiment of the present invention.

FIG. 1 shows a circuit structure of a single-phase and three-phase compatible conversion circuit with a virtual midpoint. This circuit comprises an EMC module, a power factor correction (PFC) module, a neutral clamp point switch K1, a control module, and a load. The EMC module is connected between lines A, B, C, and N of a power grid and the PFC module; three lines A1, B1 and C1 which correspond to the lines A, B and N of the power grid are led out from the EMC module and are connected with the PFC module; the three lines A1, B1 and C1 are respectively connected to a virtual midpoint 01 through capacitors CX1, CX2 and CX3; and the virtual midpoint 01 is connected to a bus midpoint 0 of the PFC module through the switch K1. The control module is used for detecting a power grid input signal and controlling the state of the switch K1 according to the type of the power grid input signal. The PFC module is used for converting a power supply input from the power grid into a direct current and supply power to the load. A topology structure of the PFC module may adopt a three-phase two-level topology structure, or a three-phase Vienna or three-phase buck topology structure.

The single-phase and three-phase compatible conversion circuit can be used in a charger. The operating principle of the above single-single and three-phase compatible conversion circuit will be described below.

First, the control module collects signals on the lines A, B, C, and N input from the power grid, then determines its operating mode, and controls the switch K1 to be turned on accordingly. The switch K1 may also be implemented by a relay, or a semiconductor switch, such as a switching circuit formed by MOS, IGBT, a bidirectional thyristor, etc., which will not be limited by the present invention.

Figure 2:
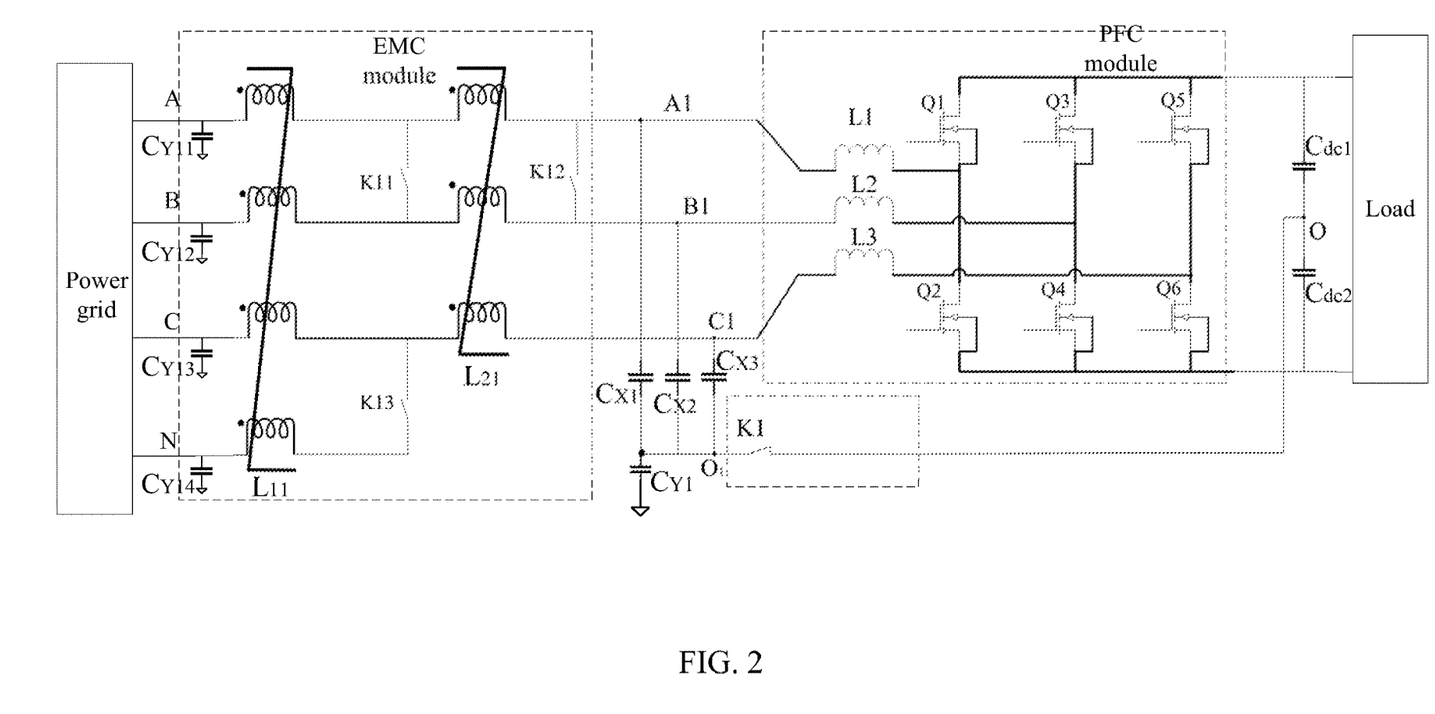
FIG. 2 is a circuit diagram of a single-phase and three-phase compatible conversion circuit in a single-phase mode.
Figure 3:
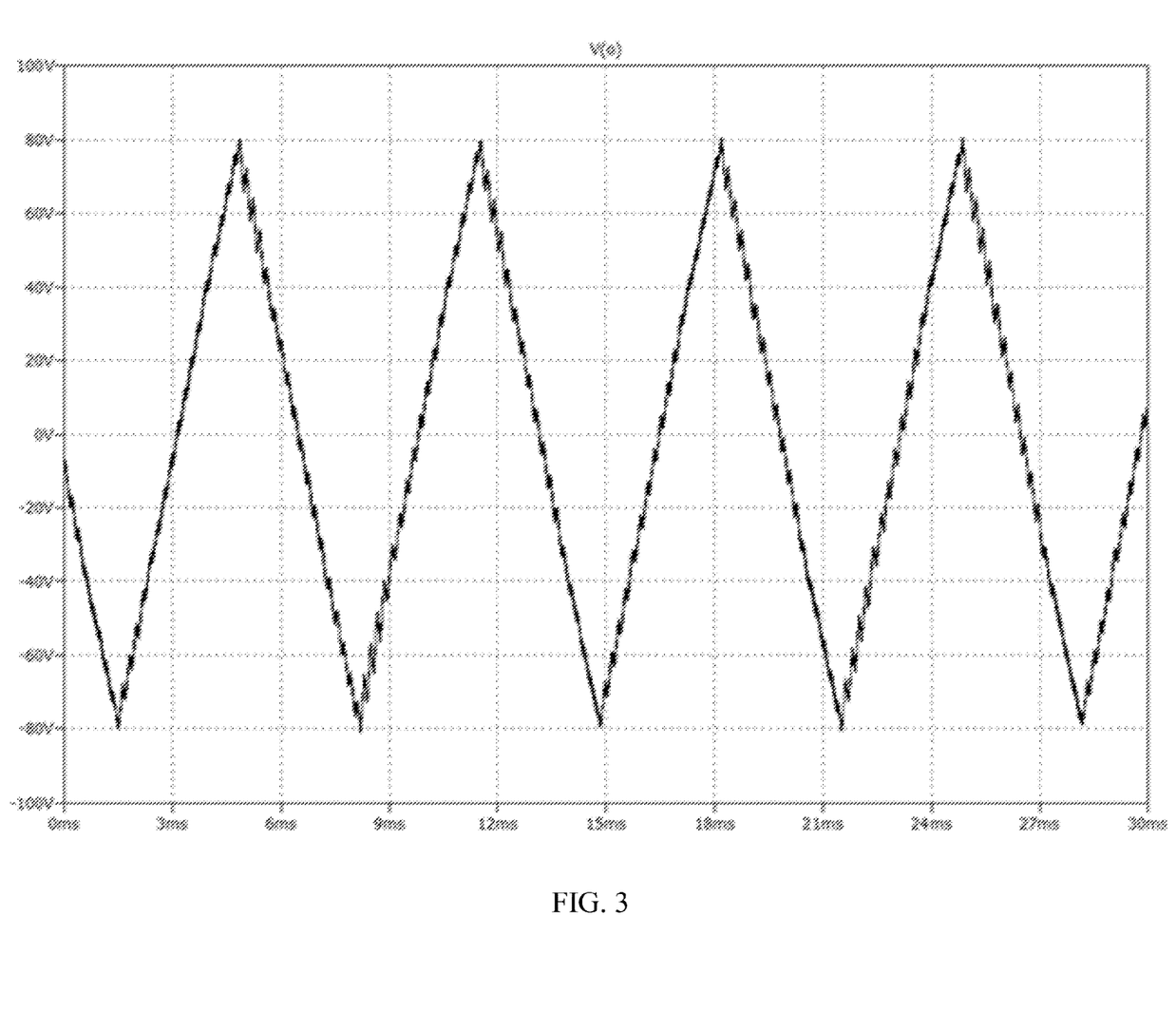
FIG. 3 is a schematic diagram of a bus midpoint voltage to the voltage of a line N or ground in the three-phase mode.

Assuming that the control module has determined that the charger is in a three-phase operating mode, if there is no K1 connecting the bus midpoint and the virtual midpoint, the high-frequency common-mode interference noise generated between a bus and the ground will be transmitted to an input port through a Y capacitor or a parasitic capacitor, making it difficult for the power supply to pass the EMC test. In view of this problem, FIG. 2 shows an exemplary topology structure in a three-phase operating mode. In this mode, inductors and capacitors of filters on the lines A, B, C, and N are in an operating condition. As shown in FIG. 2, when the control module determines that the single-phase and three-phase compatible conversion circuit is in the three-phase operating mode, the switch K1 is turned on by the control module, so that the midpoint 0 on the direct-current bus side is connected to the virtual midpoint 01 and the capacitor CY1. At this time, the lines A1, B1, and C1 and the bus midpoint form a loop through the capacitors CX1, CX2, and CX3, such that the common-mode interference can be transmitted through this low impedance path, thereby reducing the components of the bus noise transmitted to the input side. Meanwhile, the capacitor CY1 can absorb the common-mode noise on the DC side, thereby reducing the common-mode noise in the entire loop. In addition, since the bus midpoint is not clamped by the line N, all connections are capacitive connections. Therefore, the space vector modulation method can be used to obtain a wider regulation range for capacitor voltage on the DC side. As shown in FIG. 3, in the case that the space vector control is used, the voltage of the bus midpoint 0 relative to the line N or the ground is a low-frequency voltage, almost no high-frequency signal, thereby reducing the EMC interference of the system.

Figure 4:
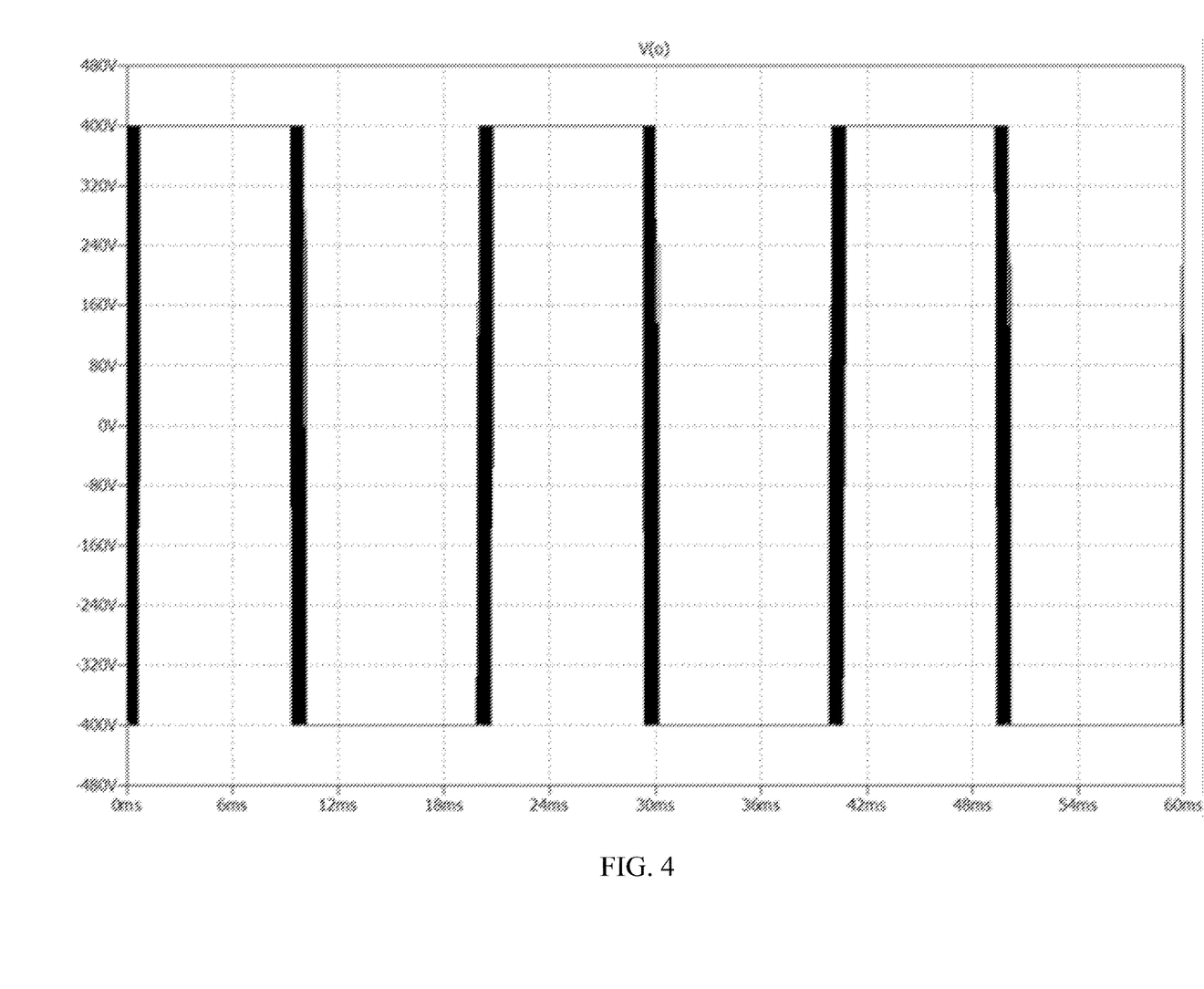
FIG. 4 is a schematic diagram of an interference voltage of the PFC bus midpoint to the ground in a single-phase mode.

When the converter is in a single-phase operating mode, the voltage of the bus midpoint to the ground will cyclically change between +Vdc and −Vdc and superimpose an AC voltage during single-phase rectification (as shown in FIG. 4, the bus midpoint voltage and the voltage to ground are shown), such voltage containing high dv/dt noise components near an input zero-crossing point. If K1 is closed (the bus midpoint is still connected to the ground through the Y capacitor), the noise on the direct-current bus side will be coupled to the ground through the virtual midpoint, which will cause greater interference noise and cause greater EMC problems.

Figure 5:
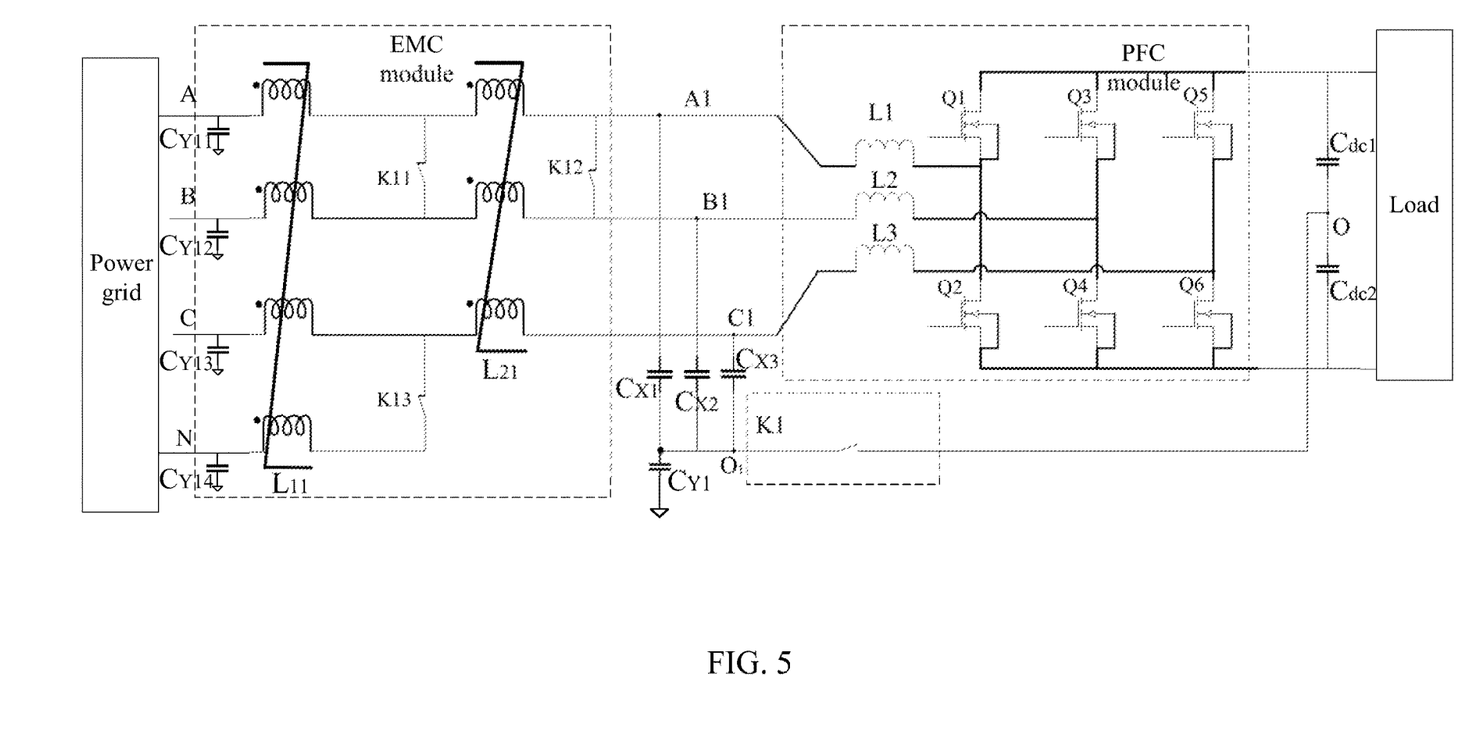
FIG. 5 is an exemplary circuit diagram of a switching circuit in the single-phase mode.

In view of this problem, FIG. 5 shows an exemplary topology structure in the single-phase operating mode. In this mode, the inductors and capacitors of the filters on the lines A and N are in an operating condition. In the single-phase operating mode, the disconnection of K1 will disconnect a path by which the bus midpoint voltage is transmitted to a ground line, making the EMC goal easier to achieve.

It should be noted that the EMC module comprises an EMC filter and a switching device. The EMC filter is composed of filter units that filter the lines A, B, C, and N respectively. The switching device is composed of switches (K11, K12, K13, K14) arranged among the lines A, B, C, and N and used for switching the form of the EMC filter. The switching device can be arranged in front of the EMC filter, or can also be arranged between and behind the EMC filter and a filter, which will be not limited in the present invention in terms of its position.

In the three-phase mode, the switching device maintains the four-way filtering of the lines A, B, C, and N of the EMC filter. In the single-phase mode, the switching device switches the EMC filter to two-way filtering. The switching device can allow the filters on one line, two lines or three lines to operate. When the filters on two lines or three lines operates, the PFC module can be operated in a interleaved mode to further reduce the input ripple current and reduce the EMC interference. As shown in FIG. 5, the second stage uses the filters on three lines, wherein K11, K12, K13 are closed and K1 is disconnected during the single-phase operation. Alternating-current inputs A and N enter through the first-stage filter, a phase A is filtered by K11 and K12 by using two windings of the second filter and then output to the PFC module, and the line N is filtered by K13 by using a winding of the second filter and then output to the PFC module.

Figure 6:
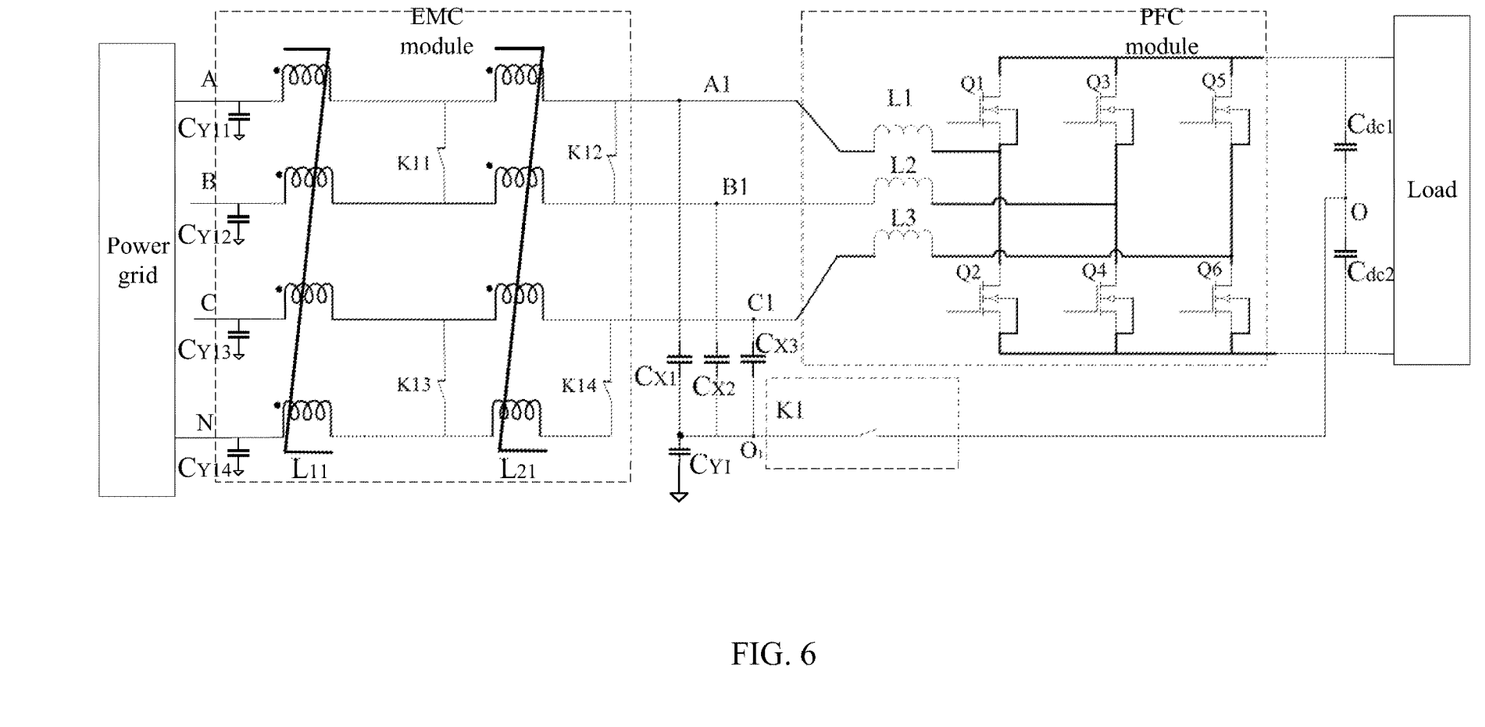
FIG. 6 is a switching topology diagram of single-phase operation using two four-line common-mode inductors.

As shown in FIG. 6, the second stage of the EMC module uses filters on four lines, wherein K11, K12, K13, K14 are closed and K1 is disconnected during the single-phase operation. Alternating-current inputs A and N enter through the first-stage filter, a phase A is filtered by K11 and K12 by using two windings of the second filter and then output to the PFC module, and the line N is filtered by K13 and K14 by using two windings of the second filter and then output to the PFC module. In the single-phase operation, the windings of the second filter are all used, so that the current of each winding can be reduced, the overall design cost can be reduced, and the efficiency can be improved. Meanwhile, L1 and L2 corresponding modules in the PFC module can operate in an interleaved mode, thereby reducing the input differential mode current. It should be noted that the switches K11, K13 can also be moved to the input port, so that the input first-stage filter can also be used better.

Figure 7:
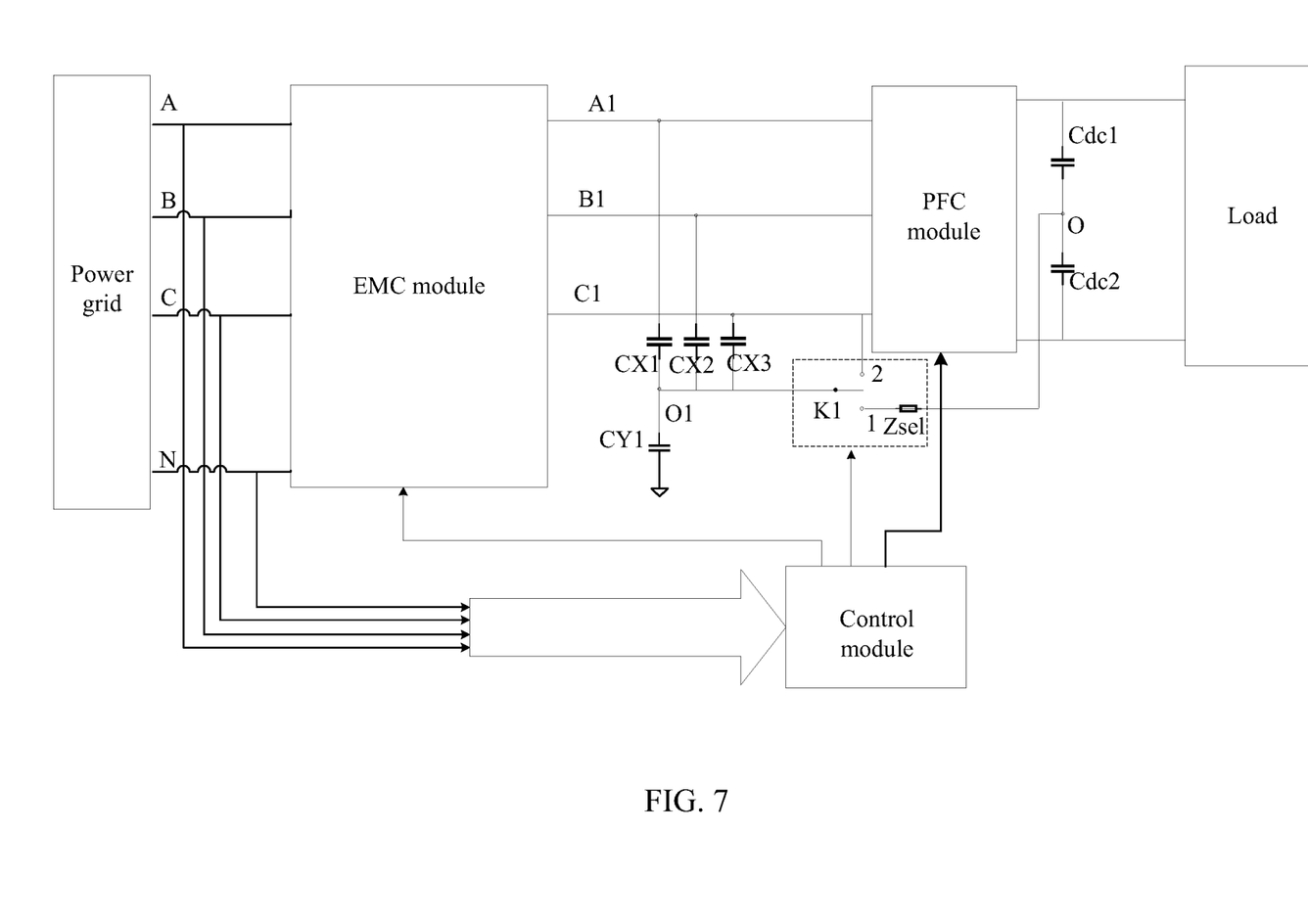
FIG. 7 is a circuit diagram in which an optional impedance Zsel is connected in series between a switch K1 and a midpoint 0, a virtual midpoint is connected to a Y capacitor, and K1 is a single-pole double-throw switch.

As shown in FIG. 7, based on the circuit shown in FIG. 1, the virtual midpoint 01 can also be grounded through the capacitor CY1, and an optional impedance Zsel can be connected in series between the switch K1 and the direct-current side midpoint 0. The switch K1 may also be a single-pole double-throw switch. When the power grid is connected to three-phase power, the control module controls the switch K1 to turn on the virtual midpoint and the bus midpoint of the PFC module; and when the power grid is connected to single-phase power, the line N of the power grid is output through the line C1 led out from the EMC module, (at this time, inside the EMC module, the line N is connected in parallel with the line C, and the line N may be output through the line C1, or through the line A1 or the output B1). The control module controls the switch K1 to turn on the virtual midpoint and the line N output from the EMC module.

Figure 8:
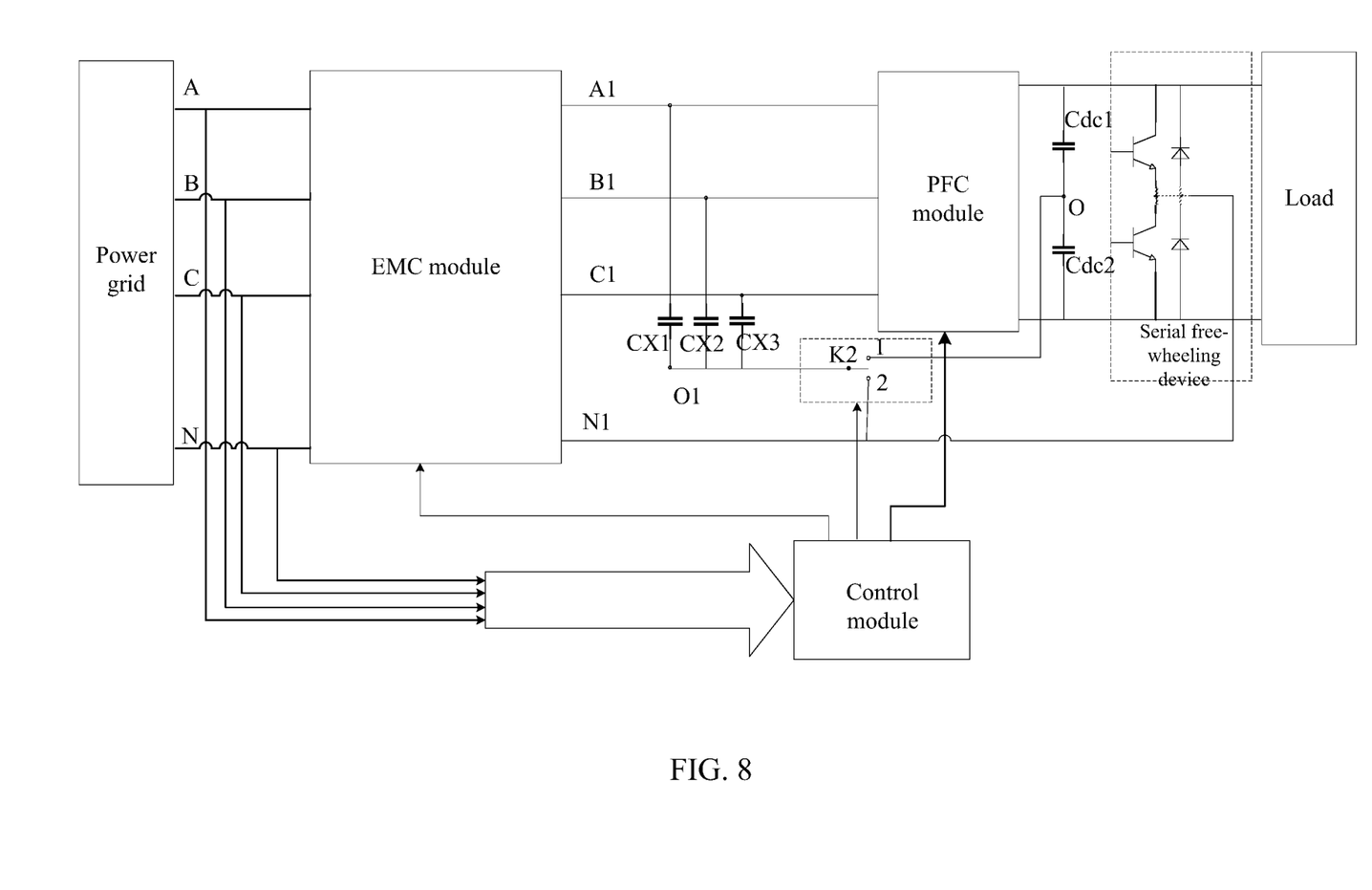
FIG. 8 is a schematic diagram of a second single-phase and three-phase compatible conversion circuit according to an embodiment of the present invention.

A second single-phase and three-phase compatible conversion circuit provided by the present invention, as shown in FIG. 8, comprises an EMC module, a PFC module, a single-pole double-throw switch K2 and a control module, wherein the EMC module is connected between lines A, B, C, and N of a power grid and the PFC module; three lines A1, B1 and C1 corresponding to the lines A, B, C and D are led out from the EMC module and are connected with an input of the PFC module; the three lines A1, B1 and C1 are respectively connected to a set virtual midpoint 01 through capacitors CX1, CX2 and CX3; and the virtual midpoint is connected to a fixed contact of the single-pole double-throw switch K2; a serial fly-wheeling device is also arranged between buses of the PFC module; a midpoint of the serial free-wheeling device is connected to a line N1 that is led out from the EMC module and corresponds to the line N of the power grid; a first dynamic contact of the single-pole double-throw switch K2 is connected to the bus midpoint 0 of the PFC module; a second dynamic contact of the single-pole double-throw switch K2 is connected to the line N1 led out from the EMC module; and the control module is used for detecting a grid input signal and controlling the state of the single-pole double-throw switch K2 according to the type of the grid input signal.

As mentioned above, the virtual midpoint 01 can also be grounded through a capacitor CY1, and an optional impedance Zsel can be connected in series between the switch K2 and the direct-current side midpoint 0.

The serial free-wheeling device comprises at least two diodes connected in series or at least two transistors connected in series. The midpoint of the two diodes is directly connected to the line N1. It should be noted that the serial free-wheeling device plays a freewheeling or commutation role, and can also be composed of only two diodes connected in series or two transistors connected in series. During the three-phase operation, this serial connection structure can be used for rectification or commutation, so that it is not necessary to occupy conversion units of L1, L2, and L3, and therefore, single-phase conversion with higher power can be realized.

Figure 9:
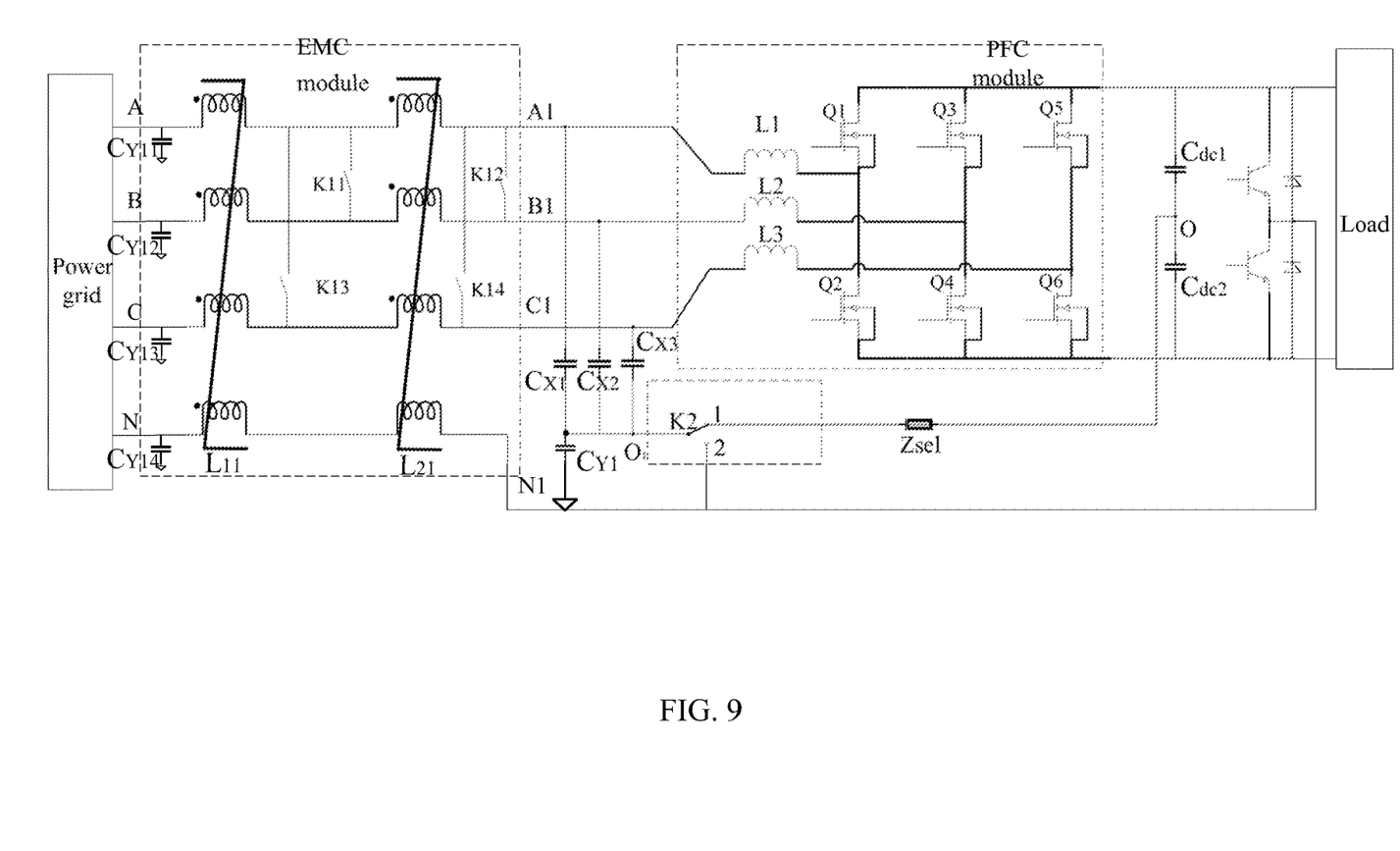
FIG. 9 is a circuit diagram of the second single-phase and three-phase compatible conversion circuit according to an embodiment of the present invention in a three-phase mode.

FIG. 9 shows a typical configuration example for three-phase input. In the case of three-phase input, K11, K12, K13, and K14 are all disconnected, and K2 is set at 1. Although the line N1 is connected to the PFC output bus through the free-wheeling device, since the voltage only floats between the buses, the free-wheeling device is not turned on, so it is equivalent to an open circuit. This configuration can achieve the same function as FIG. 2 and reduce the EMC interference during the three-phase operation.

Figure 10:
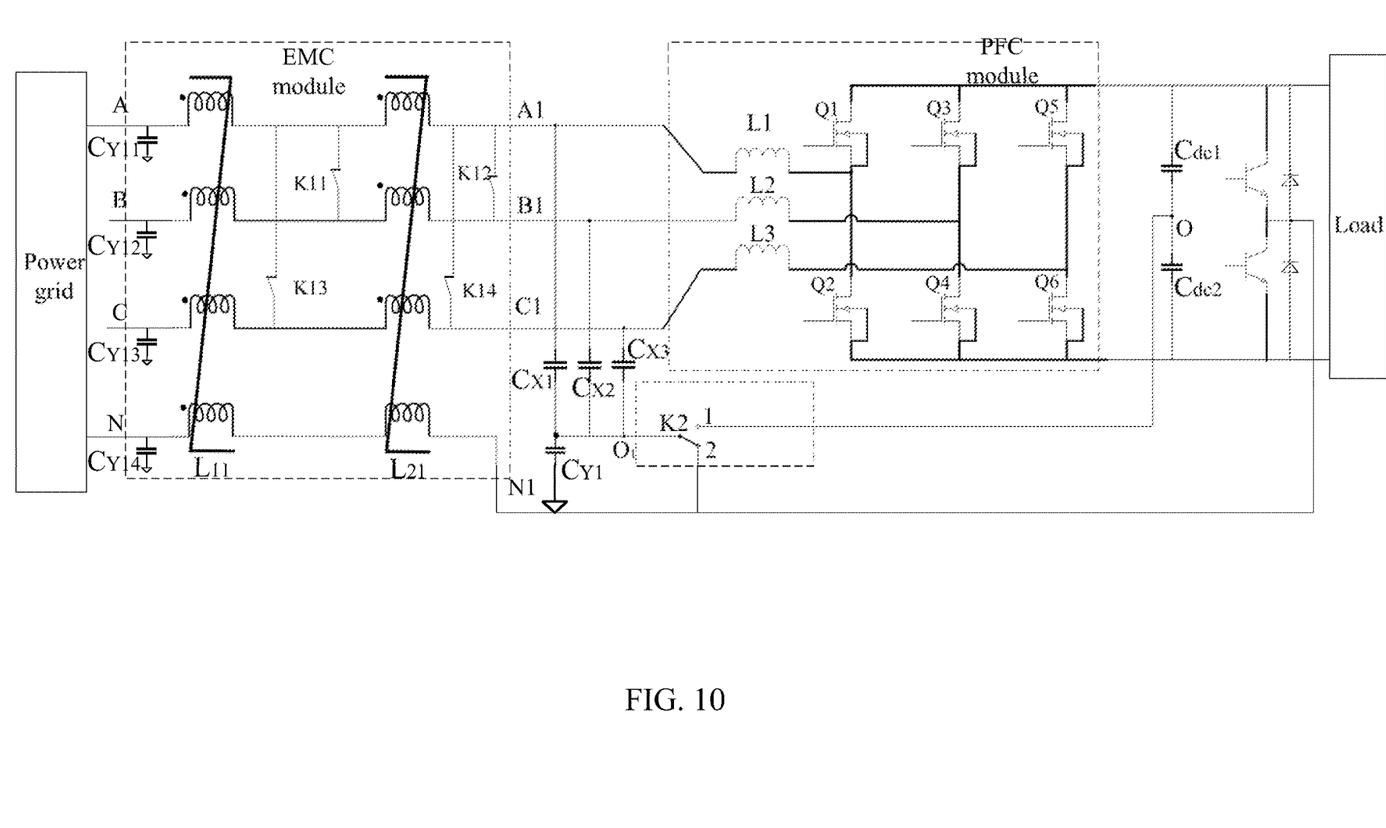
FIG. 10 is a circuit example diagram of the second single-phase and three-phase compatible conversion circuit using one switching manner according to the embodiment of the present invention in the single-phase mode.

FIG. 10 shows a typical configuration example for single-phase input. In the case of single-phase input, K11, K12, K13, and K14 are all closed, and K2 is set at 2. At this time, the PFC module can operate in an interleaved mode, thereby reducing the A-phase input differential mode ripple current and the ripple current of the PFC direct-current side capacitor in the EMC filter. Secondly, the currents flowing on the first three lines in the EMC filter L21 are equal and are respectively one-third of the single-phase input current. Therefore, this design also helps to increase the utilization rate of the filter during the single-phase operation, reduce the cost of components, and improve the efficiency.

It should be noted that when single-phase power is connected, in FIG. 10, the switching device controls the filter unit on the line A of the filter to be connected in parallel with the filter unit on the line B and the filter unit on the line C and then connected to the PFC module, or controls the filter unit on the line A of the filter to be connected to the PFC module alone, or controls the filter unit on the line A to be connected in parallel to the filter unit on the line B or the filter unit on the line C and then connected to the PFC module.

It should also be noted that, in the embodiments of the present invention, the single-pole double-throw switch K2 can also be replaced by a single-pole single-throw switch or two switches connected between the bus midpoint and the virtual midpoint of the PFC module. All the switches can be implemented by using semiconductor switches.

In summary, the single-single and three-phase compatible conversion circuit of the present invention can be flexibly switched between the single-phase operating mode and the three-phase operating mode, adapt to the requirements of different single-phase and three-phase noise sources on the filter structure, and compatibly reduce the EMC noise in the single-single and three-phase operating modes; and maintain an output voltage within a wider adjustment range by using an optimized control mode (such as space vector control) in the three-phase operating mode, thereby improving the performances of the converter. Meanwhile, the switching circuit can make full use of EMC common-mode inductance, thereby reducing the product cost.

The foregoing descriptions are merely preferred embodiments of the present disclosure, and are not intended to limit the present invention. Within the spirit and principles of the present disclosure, any modifications, equivalent substitutions, improvements, etc., should be included in the protection scope of the present invention.

What is claimed is:

1. A single-phase and three-phase compatible conversion circuit, comprising:
    an EMC module,
    a PFC module,
    a switch K1, and
    a control module,
    wherein the EMC module is connected between lines A, B, C and N of a power grid and the PFC module; three lines A1, B1 and C1 are led out from the EMC module and are connected with the PFC module; the three lines A1, B1 and C1 are respectively connected to a set virtual midpoint through capacitors CX1, CX2 and CX3; and the virtual midpoint is connected to a bus midpoint of the PFC module through the switch K1; and the control module is used for detecting a power grid input signal and controlling the state of the switch K1 according to the type of the power grid input signal.

2. The single-phase and three-phase compatible conversion circuit according to claim 1, wherein the virtual midpoint is grounded through a capacitor CY1.

3. The single-phase and three-phase compatible conversion circuit according to claim 1, wherein when the power grid is connected to three-phase power, the control module controls the switch K1 to be turned on; and when the power grid is connected to single-phase power, the control module controls the switch K1 to be turned off.

4. The single-phase and three-phase compatible conversion circuit according to claim 1, wherein the EMC module comprises an EMC filter and a switching device; the EMC filter is composed of filter units that filter the lines A, B, C, and N respectively; and the switching device is composed of switches arranged among the lines A, B, C, and N and used for switching the state of the EMC filter.

5. The single-phase and three-phase compatible conversion circuit according to claim 4, wherein when the power grid is connected to three-phase power, the switching device sets the EMC filter to a state of filtering the lines A, B, C, and N of the power grid; and when the power grid is connected to single-phase power, the switching device sets the EMC filter to a two-way filtering state.

6. The single-phase and three-phase compatible conversion circuit according to claim 1, wherein K1 is a single-pole double-throw switch; when the power grid is connected to three-phase power, the control module controls the switch K1 to turn on the virtual midpoint and the bus midpoint of the PFC module; and when the power grid is connected to single-phase power, the line N of the power grid is output through one of the three lines A1, B1, and C1 led out from the EMC module, and the control module controls the switch K1 to turn on the virtual midpoint and the N line output from the EMC module.

7. A single-phase and three-phase compatible conversion circuit, comprising an EMC module, a PFC module, a single-pole double-throw switch K2 and a control module, wherein the EMC module is connected between lines A, B, C, and N of a power grid and the PFC module; three lines A1, B1 and C1 are led out from the EMC module and are connected with the PFC module; the three lines A1, B1 and C1 are respectively connected to a set virtual midpoint through capacitors CX1, CX2 and CX3; and the virtual midpoint is connected to a fixed contact of the single-pole double-throw switch K2; a serial fly-wheeling device is also arranged between buses of the PFC module; a midpoint of the serial free-wheeling device is connected to a line N1 led out from the EMC module; a first dynamic contact of the single-pole double-throw switch K2 is connected to a bus midpoint of the PFC module; a second dynamic contact of the single-pole double-throw switch K2 is connected to the line N1 led out from the EMC module; and the control module is used for detecting a grid input signal and controlling the state of the single-pole double-throw switch K2 according to the type of the grid input signal.

8. The single-phase and three-phase compatible conversion circuit according to claim 7, wherein when the power grid is connected to three-phase power, the control module controls the first dynamic contact of the single-pole double-throw switch K2 to be turned on; and when the power grid is connected to single-phase power, the control module controls the second dynamic contact of the single-pole double-throw switch K2 to be turned on.

9. The single-phase and three-phase compatible conversion circuit according to claim 7, wherein the EMC module comprises an EMC filter and a switching device; the EMC filter is composed of filter units that filter the lines A, B, C, and N respectively; and the switching device is composed of switches arranged among the lines A, B, C, and N and used for switching the form of the EMC filter.

10. The single-phase and three-phase compatible conversion circuit according to claim 7, wherein when the power grid is connected to three-phase power, the switching device sets the EMC filter to a form of filtering the lines A, B, C, and N of the power grid; and when the power grid is connected to single-phase power, the switching device controls a filter unit on the line A of the filter to be connected to the PFC module alone, or controls the filter unit on the line A of the filter to be connected in parallel with a filter unit on the line B or a filter unit on the line C and then connected to the PFC module, or controls the filter unit on the line A of the filter to be connected in parallel with the filter unit on the line B and the filter unit on the line C and then connected to the PFC module.

11. The single-phase and three-phase compatible conversion circuit according to claim 7, wherein the serial freewheeling device comprises at least two diodes connected in series or at least two transistors connected in series.

12. The single-phase and three-phase compatible conversion circuit according to claim 11, wherein when the power grid is connected to three-phase power, the control module controls the first dynamic contact of the single-pole double-throw switch K2 to be turned on; and when the power grid is connected to single-phase power, the control module controls the second dynamic contact of the single-pole double-throw switch K2 to be turned on.

13. The single-phase and three-phase compatible conversion circuit according to claim 11, wherein the EMC module comprises an EMC filter and a switching device; the EMC filter is composed of filter units that filter the lines A, B, C, and N respectively; and the switching device is composed of switches arranged among the lines A, B, C, and N and used for switching the form of the EMC filter.

14. The single-phase and three-phase compatible conversion circuit according to claim 11, wherein when the power grid is connected to three-phase power, the switching device sets the EMC filter to a form of filtering the lines A, B, C, and N of the power grid; and when the power grid is connected to single-phase power, the switching device controls a filter unit on the line A of the filter to be connected to the PFC module alone, or controls the filter unit on the line A of the filter to be connected in parallel with a filter unit on the line B or a filter unit on the line C and then connected to the PFC module, or controls the filter unit on the line A of the filter to be connected in parallel with the filter unit on the line B and the filter unit on the line C and then connected to the PFC module.

15. A vehicle-mounted charger, comprising the single-phase and three-phase compatible conversion circuit according to claim 1.

16. A vehicle-mounted charger, comprising the single-phase and three-phase compatible conversion circuit according to claim 7.

* * * * *